Sept. 21, 1965  R. S. WILLIS  3,207,181
MULTIPLE ORIFICE VALVE
Filed Oct. 11, 1963  2 Sheets-Sheet 1
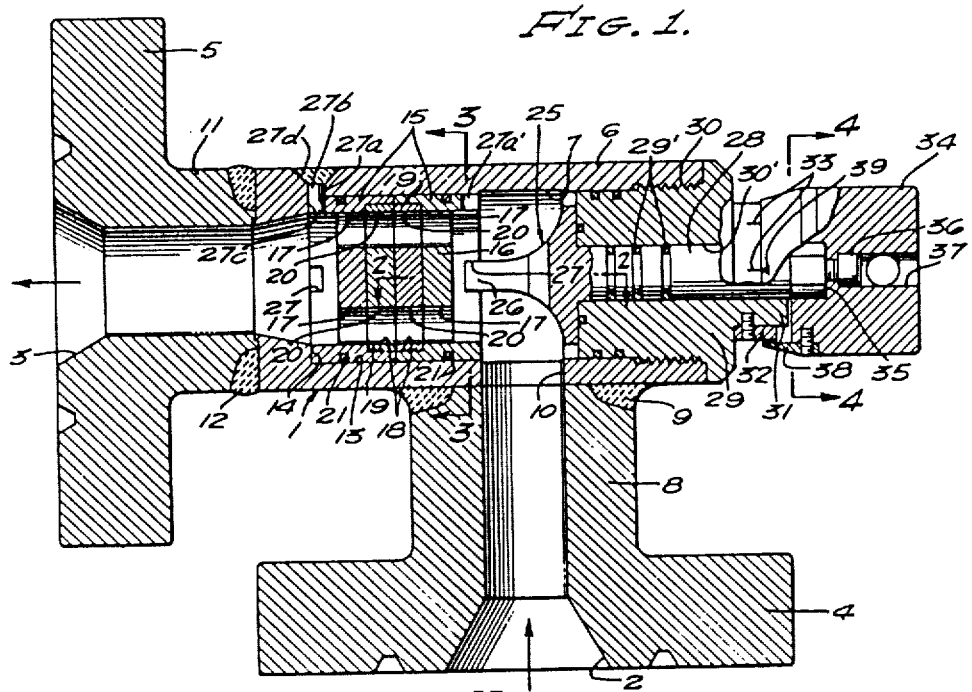
FIG. 1.
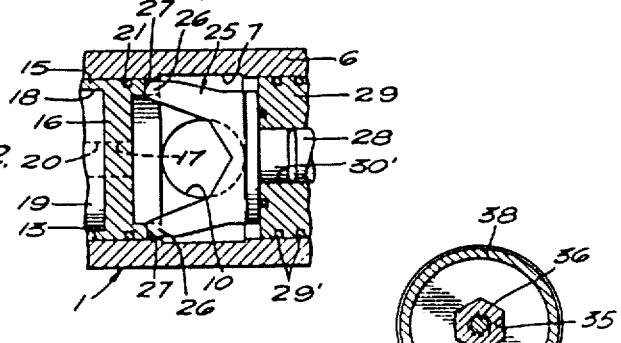
FIG. 2.
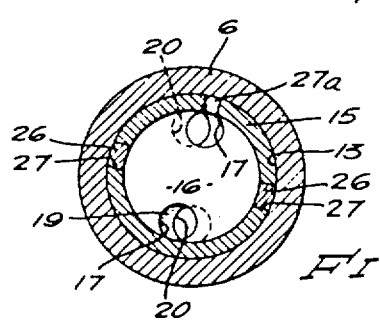
FIG. 3.
FIG. 4.
ROBERT S. WILLIS
INVENTOR.
BY Paul A. Weilein
ATTORNEY Sept. 21, 1965   R. S. WILLIS   3,207,181
MULTIPLE ORIFICE VALVE
Filed Oct. 11, 1963   2 Sheets-Sheet 2

ROBERT S. WILLIS
INVENTOR.

BY Paul A. Weilein
ATTORNEY

United States Patent Office 3,207,181
Patented Sept. 21, 1965

3,207,181
MULTIPLE ORIFICE VALVE
Robert S. Willis, 4341 Olive, Long Beach, Calif.; N. Elizabeth Willis, executrix of said Robert S. Willis, deceased
Filed Oct. 11, 1963, Ser. No. 315,471
5 Claims. (Cl. 137—625.31)

This application is a continuation-in-part of my pending application, Serial No. 92,941, filed March 2 1961 and now abandoned.

The present invention relates to valves, and more particularly to a multiple orifice valve of novel structure.

Valves of the type wherein a pair of adjacent orificed discs are relatively rotated so as to move the orifice in one disc relative to the other disc thereby enlarging the open flow passage through the discs or reducing such flow passage, have heretofore been provided for use in controlling high pressure, high volume fluid flows where certain problems such as valve chatter and precise flow control are encountered with more conventional flow control valves such as needle valves and the like.

A object of the present invention is to provide such a multiple orifice valve of a novel construction whereby it is readily serviced without removal from the flow line.

Another object of the invention is to provide a multiple orifice flow control valve wherein all of the valve parts are removably disposed in the valve body and are removable therefrom upon removal of the valve bonnet through which the valve actuating stem extends.

Yet another object is to provide a valve of the multiple disc and orifice type wherein a pair of discs are supported in a pair of disc carriers, the latter being sealingly engaged in a bore in the valve body and respectively carrying an orificed valve disc, whereby upon the need arising for replacement or change of the orificed discs for any reason, the disc carriers may be removed and new discs substituted for the existing discs and the disc carriers thereafter readily reinstalled in the valve body.

Another object of the invention is to provide a multiple disc orifice type valve construction having a novel actuating means in the form of a forked member having an actuator stem extending through the valve bonnet and engaged at its outer end by an indicator head for clearly indicating the relative angular positions of the valve discs.

Still another object of the invention is to provide an orifice valve of the revolvable disc type, wherein the certain of the elements which are located within the path of fluid flowing through the valve are so constructed as to direct flow in a path such as to aid in the prevention of washing or erosin of the valve body. According to one embodiment, one of the discs is provided with convergent orifices merging with one another at their discharge end to form an opening corresponding with the discharge opening in the valve body. In another embodiment, this feature is availed of in a structure in which the disc carriers are retained in the body by a removable flange and outlet element whereby related discs and outlet elements may be assembled in the body having various related orifice and outlet opening sizes.

Other objects and advantages of the invention will be hereinafter described or will become apparent to those skilled in the art and the novel features of the invention will be defined in the appended claims.

In the accompanying drawings:

FIG. 1 is a longitudinal sectional view through a valve assembly made in accordance with the invention;

FIG. 2 is a fragmentary detail section as taken on the line 2—2 of FIG. 1;

FIG. 3 is a transverse sectional view as taken on the line 3—3 of FIG. 1 and with the valve partially closed;

FIG. 4 is a transverse sectional view as taken on the line 4—4 of FIG. 1;

Like reference characters in the several views of the drawing and in the following description designate corresponding parts.

Figure 5:
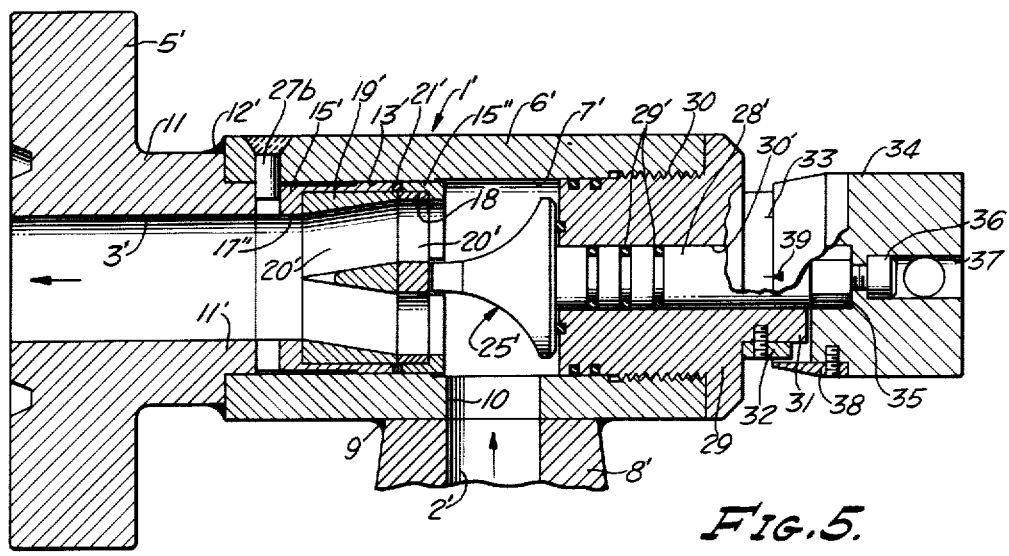
FIG. 5 is a view corresponding generally to FIG. 1, but showing a further improvement in the valve construction.

Referring to FIG. 1, the present invention is illustratively shown as embodied in a valve body generally denoted at 1 having an inlet opening 2 and an outlet opening 3, this body 1 is of the so-called L flanged type and has a pair of mounting flanges 4 and 5. It will be understood, however, that the invention may as well be embodied in a so-called in-line valve body.

The body 1 includes a main section 6 having a longitudinally extended opening 7 therethrough. The flange 4 has a section 8 welded as at 9 or otherwise suitably secured to the body section 6 and projecting laterally therefrom, and the inlet port extends through the tubular section 8 so as to communicate with the passage 7 in the body section 6 through a port 10 in the latter. The flange 5 has a tubular supporting section 11 welded as at 12 or otherwise suitably secured to one end of the body section 6 with the outlet port 3 extending through the tubular flange section 11.

Within the body section 6 it is bored to provided a cylindrical seat 13 terminating in a shoulder 14, and within the seat 13 there is disposed a pair of disc carriers each denoted at 15 and each being generally cylindrical in form but having an internal web 16 provided with a pair of ports 17 radially offset from the axis of the respective disc carriers. Adjacent the web 16 each of the disc carriers 15 is provided with a seat 18 in which a disc 19 is press fit or otherwise firmly but removably disposed. Each disc 19 also has a pair of openings 20 therethrough. The openings 17 in the disc carrier web 16 and the openings 20 in the discs 19 are disposed in alignment to enable the flow of fluid through each disc carrier and its disc, and with the respective disc carriers and discs in at least one position, the openings through the disc carriers and discs will be aligned as shown in FIG. 1 to allow the flow of fluid through the opening 7 in the valve body section 6.

In order to prevent the flow of fluid between the disc carriers and the inside wall of the body member 6 within the seat 13, each of the disc carriers is preferably provided with an O-ring seal 21 affording means providing a seal between the respective disc carriers and the seat 13 therefor.

Means are provided for adjusting the angular position of the innermost disc carrier 15 relative to the outermost disc carrier 15 so as to complete obturation of the openings 20 in the disc carried by the outermost disc carrier 15 as illustrated in FIG. 3. Such means is in the form of a forked member 25 disposed within the opening 7 of the body section 6 and having a pair of laterally spaced tines 26 engageable in a pair of diametrically opposed notches or recesses 27 in the adjacent disc carrier 15. Preferably, each of the disc carriers is provided with a pair of notches 27 as just described, whereby the discs may be interchangeably installed in the innermost or outermost position and each is adapted for engagement by the tines 26 of turning fork 25.

In addition, each disc carrier is also provided with at least one notch 27a angularly offset from notches 27, preferably 90°. This notch 27a receives a pin 27b or other suitable projection in the seat 13 for the disc carriers so as to fix the outermost carrier against angular movement and establish a known orientation of the latter with respect to the innermost disc carrier, for a purpose which will hereinafter more fully appear. In the illustrative embodiment, the pin 27b extends through an opening 27c in the housing 6 and is secured in place as by a weld at 27d.

The turning fork is mounted at the inner extremity of an actuator stem 28 which extends outwardly through a valve bonnet 29 threaded as at 30 into the end of body section 6 remote from flange 5. A suitable number of O-rings 29' are carried by the stem 28 to provide means for sealing the stem 28 within the bore 30' which extends through the bonnet for the reception of the stem 28.

Means are also provided in accordance with the objectives of the invention for rotating the stem 28 and thus the fork 25, as well as for indicating the relative angular position of the innermost disc relative to the outermost disc so as to thereby indicate the degree of closing of the flow passage through the openings 17 in the disc carriers and openings 20 in the discs. Accordingly, in the illustrative embodiment the valve bonnet at its outer end has a boss 31 thereon about which is disposed a ring 32 having graduations 33 thereon. An actuator head 34 is secured to the outer extremity of the stem 28. In this connection, the actuator head 34 is preferably provided with a recess 35 of irregular form in which is engaged the correspondingly formed end of the actuator stem 28. The head 34 is held in assembly with the stem 28 as by means of a cap screw 36 recessed in an end bore 37 in the actuator head 34.

The actuator head 34 is provided with a skirt 38 having thereon an index mark 39 whereby it will be observed that the actuator head 34 and the graduated ring 32 provide scale means which will afford an indication of the angular relation that the innermost orifice disc 19 bears to the outermost orifice disc 19. It will be noted that the outermost disc carrier 15 will be held by pin 27b in an initially assembled position having an orientation which is related to the scale markings 33 on the collar 32.

During use of the valve of the present invention, it will be apparent that when it is desired to more or less restrict the flow through the orifice discs 19 from the inlet 2 to the outlet 3, the actuator head 34 may be rotated so that the openings 20 in the innermost disc 19 are more or less in registry with those of the outermost disc 19, through a range of positions from full registry to full occlusion.

Moreover, the discs 19 may preferably be composed of hardened and ground steel, tungsten carbide, or a ceramic material, as may be required by various operating conditions and the openings 20 through the respective orifice discs 19 being substantially circular, will present veritable knife edges just prior to movement to a fully occluded position so as to consequently enable extremely fine flow control over a wider range of flow rates, without the ordinary chattering and vibration encountered in conventional valves having the ability to control flow to a fine degree, such as conventional needle valves.

Removal of the orifice discs 19 for replacement, for example, by discs having orifices of different diameters or for replacement of worn discs, may be readily accomplished without removing the valve assembly from the flow line. In this connection, it will be observed that the bonnet 29 may be backed out of its threaded connection to the body section 6 and that the turning fork and its actuator stem, together with the actuator head, are joined in the unitary subassembly removable as such from the body section 6. Upon removal of this subassembly from the body section 6, the longitudinal opening 7 through the body section 6 is open at one end to enable removal of the disc carriers 15. Moreover, reassembly of the valve is facilitated by reason of the fact that the disc carriers are identical units so that either of them may be employed as the outermost disc carrier or the innermost disc carrier, as previously described.

Referring now to FIG. 5, there is shown a valve similar in some respect to that described above, and to that extent bearing the same reference numerals, but differing therefrom in respect to the orifice disc and carrier construction, and therefore bearing primed reference numerals to that extent.

In this construction but a single O-ring seal 21' is employed between opposing ends of the disc carriers 15' and 15" and sealing therewith as well as with the body 6' in opening 7'. The outermost disc carrier 15' abuts with an inward extension 11' of the flange section 11. In addition, the latter disc carrier is provided with an opening 17" corresponding to, or if desired smaller than, the outlet opening 3' of the flange section 11'.

In this embodiment, the openings 20' through the orifice disc 19' converge toward opening 17" and merge to form a combined outlet corresponding in size to the opening 17" and hence being equal in size to the body outlet 3', or smaller than the latter if desired, so as to avoid washing or fluid erosion of the body at the outlet. Since the orifice disc as previously described may be of ceramic or other erosion resistant material, valve life may be significantly enhanced.

Figure 6:
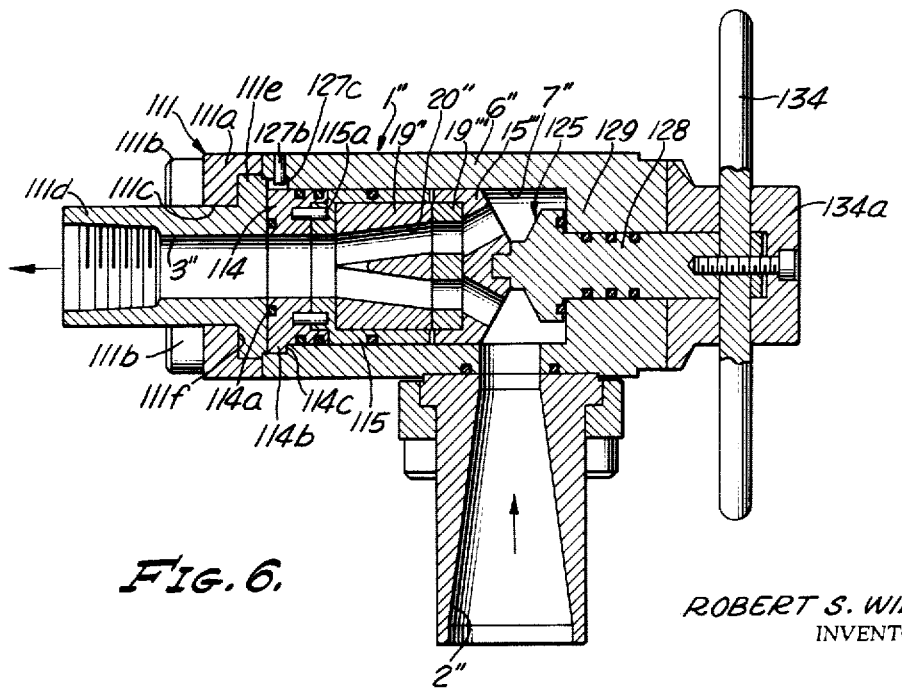
FIG. 6 is another view showing the improvement of FIG. 5 in a further modified construction.

Referring to FIG. 6, there is illustrated a further improvement in respect to the outlet end of the valve assembly and incorporating a simplified operating means.

In this embodiment the orifice disc carriers and discs are removable from the outlet end of the body and the actuator means is illustrated as including a stem 128 on the turning fork 125 and extending through an opening in an end wall 129 of the valve body for connection to an operator 134. It will be understood, however, that if desired, the bonnet assembly of the embodiments previously described may be employed.

In this embodiment, there is an end connection assembly 111 including an end flange 111a removably connected to the outlet end of valve body 1 by screw fasteners 111b, as is apparent. This end flange is bored at 111c for reception of the stem of a threaded connector 111d adapted for connection to an outlet line, not shown, and having a flanged end 111e which projects outwardly and engages with an internal shoulder 111f of the end flange 111.

Within the bore 7" of the body 1" is a disc carrier seat 114 which abuts with the flanged end of the connector 111d and is sealed relative thereto by an O-ring 114a or other suitable sealing means. About the outer periphery of the seat 114 in a flange 114b which shoulders at 114c in the valve body 1 and is held against rotation by means of coengageable elements on the seat 114 and carried by the body 1". Illustratively, such coengageable means includes a pin 127b which extends into a slot 127c in flange 114b.

The disc carrier 115 of this embodiment corresponds to that shown in FIG. 5, and is held against rotation by coengageable means including one or more pins 115a extending between pin openings in seat 114 and disc carrier 115, so that the disc carrier 115 is effectively connected to the body and held against rotation.

It will now be observed that removal of end flange 111 will permit the endwise removal from the body 1" of the connector 111d, the disc carrier seat 114 and the stationary disc carrier 115 with its disc 19" which is, for illustration, shown as corresponding to the disc of FIG. 5. Similarly, the revolvable disc carrier 15''' with its disc 19''' is removable endwise of the body 1", following which the turning member 128 may be removed upon disconnection of the connector 134a and operator 134 from actuator stem 128. Accordingly, the disc carriers and the connector may be replaced by parts having orifices and outlet openings of different but corresponding sizes at the throat of the flow passage, i.e., where the orifices 20' merge with outlet 3" which, in this embodiment of FIG. 6, extends through connector 111d, seat 114, and disc carrier 115.

While the specific details of the invention have been herein shown and described, changes and alterations may be resorted to without departing from the spirit of the invention as defined in the appended claims.

I claim:

1. A flow control valve comprising: a valve body having a longitudinally extended opening therein; an inlet leading to said opening and an outlet leading from said opening; a pair of relatively rotatable disc carriers disposed in said opening between said inlet and said outlet; a disc carried by each of said disc carriers with the respective discs disposed in contiguous relation; means extending into said body for rotating one of said disc carriers relative to the other of said disc carriers; each of said disc carriers comprising a body transversely spanning said opening and having an axially extended outer marginal skirt forming a seat for its disc; said discs and disc carriers having openings therethrough movable into and out of alignment to control the flow of fluid from said inlet to said outlet.

2. A valve as defined in claim 1, wherein said means for rotating one of said disc carriers includes a forked member having laterally spaced tines, and said inlet leading into said body between said tines to the other of said disc carriers.

3. A flow control valve as defined in claim 1 wherein the openings through the disc adjacent said outlet converge toward said outlet and merge to form an enlarged opening corresponding with said outlet, and the opening through said disc carrier adjacent said outlet corresponding to said enlarged opening and to said outlet.

4. A flow control valve as defined in claim 1 wherein the disc adjacent said outlet has orifices which converge toward said outlet and merge to form an opening corresponding with said outlet; and means at the outlet end of said body removably retaining said disc carriers and discs in said opening in said body; said retaining means comprising an end flange having an opening therethrough; a connector extending through said opening and adapted for connection to an outlet line; and means forming a removable seal for the non-rotating disc carrier and for holding the same against rotation with said rotatable disc carrier.

5. A control valve comprising: a body having an opening extending longitudinally therethrough; an inlet leading into said opening and an outlet leading from said opening; a cylindrical seat in said body circumscribing said opening between said inlet and said outlet; a pair of relatively rotatable disc carriers disposed in said seat; means providing a seal between each of said disc carriers and said seat; a pair of discs; one of said discs being carried by one of said disc carriers and the other of said discs being carried by the other of said disc carriers with said discs disposed in contiguous relation; said disc carriers and discs having openings extending longitudinally therethrough an offset to one side of the axis of said disc carriers and discs so as to be moved into and out of registry upon relative rotation of said disc carriers; each of said carriers having at least a pair of peripheral recesses similarly located on each carrier; and means extending into the opening in said body and engaged in said recesses in one of said carriers for rotating said one of said disc carriers relative to the other of said disc carriers.

References Cited by the Examiner

UNITED STATES PATENTS

| | | | |
|---|---|---|---|
| 762,933 | 6/04 | Norling | 137—625.31 |
| 860,684 | 7/07 | Montgomery | 137—625.31 |
| 907,009 | 12/08 | Cramer | 137—271 |
| 1,014,766 | 1/12 | Lytton | 137—625.31 |
| 1,133,853 | 3/15 | Gold | 137—625.46 |
| 1,233,262 | 7/17 | Vaeth | 137—625.31 |
| 2,531,480 | 11/50 | Sparklin et al. | 251—208 |

M. CARY NELSON, *Primary Examiner.*